(12) United States Patent
Phan et al.

(10) Patent No.: US 7,167,200 B1
(45) Date of Patent: Jan. 23, 2007

(54) CMOS IMAGE SENSOR OVERSATURATION PROTECTION CIRCUIT

(75) Inventors: Christina Phan, San Jose, CA (US); Bumha Lee, Mountain View, CA (US)

(73) Assignee: National Semiconductor Corporation

( * ) Notice: Subject to any disclaimer, the term of this patent is extended or adjusted under 35 U.S.C. 154(b) by 755 days.

(21) Appl. No.: 10/607,943

(22) Filed: Jun. 27, 2003

(51) Int. Cl.
*H04N 5/335* (2006.01)

(52) U.S. Cl. ..................... 348/308; 348/296

(58) Field of Classification Search ................ 348/308, 348/294, 241, 296, 297; 250/208.1
See application file for complete search history.

(56) References Cited

U.S. PATENT DOCUMENTS

2003/0133627 A1* 7/2003 Brehmer et al. ............ 382/308
2004/0036783 A1* 2/2004 Barna ......................... 348/300
2005/0030401 A1* 2/2005 Ovsiannikov et al. ....... 348/302
2006/0065814 A1* 3/2006 Altice et al. .............. 250/208.1

* cited by examiner

*Primary Examiner*—Tuan Ho
(74) *Attorney, Agent, or Firm*—Peyton C. Watkins

(57) ABSTRACT

An oversaturation protection circuit is provided within a CMOS image sensor. A detector is arranged to monitor an output column line that is associated with a pixel to determine whether the pixel is oversaturated after being reset. If the pixel is oversaturated after being reset, the level of the pixel is determined by measuring the difference between a first reference voltage and the integrated voltage of the pixel. If the pixel is not oversaturated after being reset, the level of the pixel is determined by measuring the difference between the voltage of the column line shortly after reset and the integrated voltage of the pixel. A detector may be arranged to provide the result of the comparison of the associated pixel to be used with other pixels within the pixel column that are adjacent to the associated pixel.

20 Claims, 3 Drawing Sheets

CMOS IMAGE SENSOR OVERSATURATION PROTECTION CIRCUIT

FIELD OF THE INVENTION

The present invention relates generally to electronic image sensors, and more particularly to CMOS image sensors.

BACKGROUND OF THE INVENTION

Electronic image sensors are widely used to produce video and photographic images. CMOS image sensors are typically used in lower-cost applications, while CCD image sensors are widely used in higher cost applications. CMOS image sensors offer the ability to integrate the pixel sensors and related circuits on a single substrate, which lowers the costs of CMOS image sensors as compared to CCD image sensors. However, CMOS image sensors are subject to oversaturation when imaging very bright objects (such as the sun). Oversaturation of the CMOS image sensor may result in very bright objects appearing dark instead of bright within the picture.

An appreciation of the present invention and its improvements can be obtained by reference to the accompanying drawings, which are briefly summarized below, to the following detailed description of illustrated embodiments of the invention, and to the appended claims.

DETAILED DESCRIPTION OF THE PREFERRED EMBODIMENT

Figure 1:
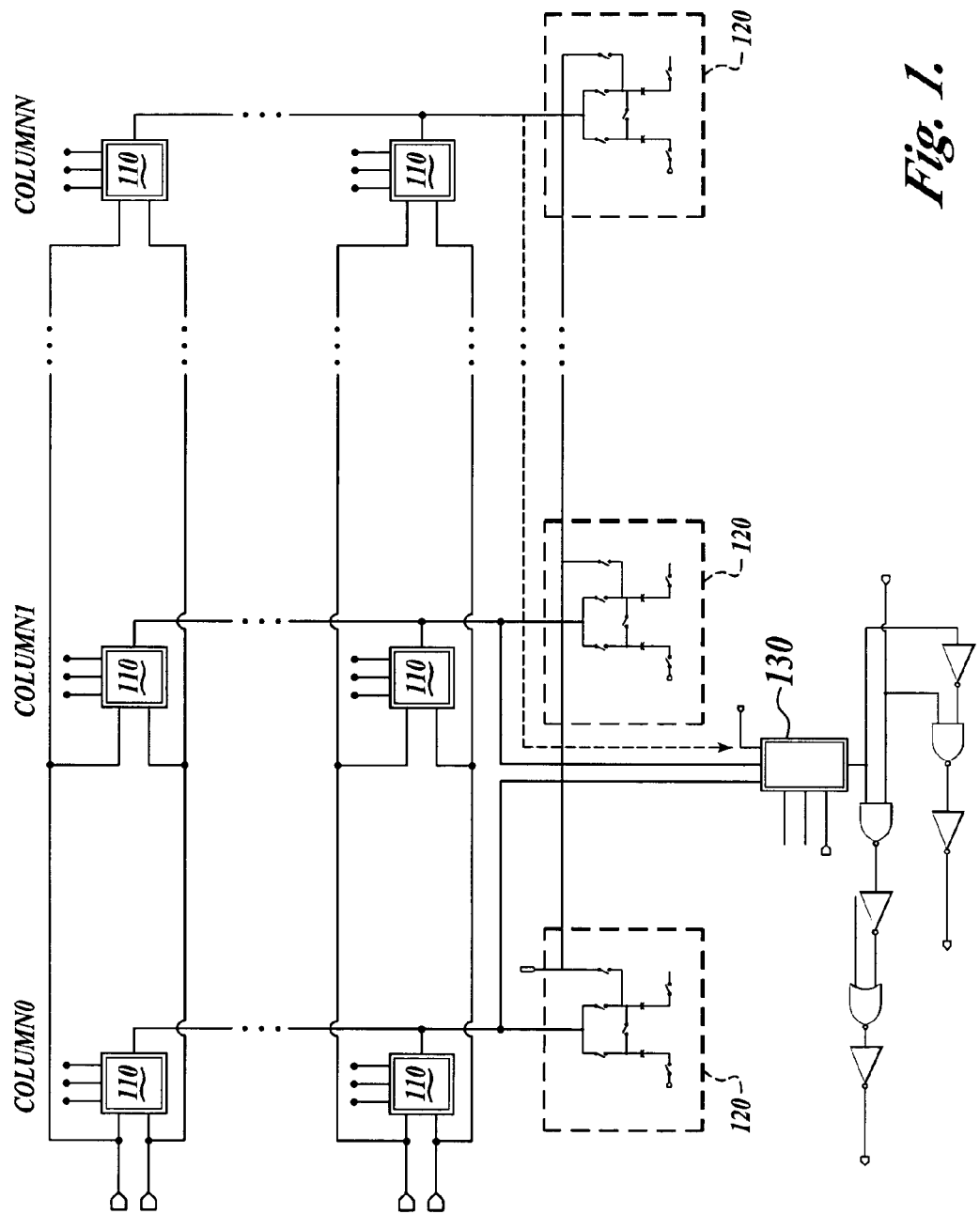
FIG. 1 is a schematic diagram of an example CMOS image sensor having an oversaturation protection circuit used in accordance with the present invention.

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected, or an indirect connection through one or more passive or active intermediary devices. The term "circuit" means either a single component or a multiplicity of components, either active and/or passive, that are coupled together to provide a desired function. The term "signal" means at least one current, voltage, or data signal. Referring to the drawings, like numbers indicate like parts throughout the views.

CMOS image sensors typically comprise pixel cells (i.e., pixels) that are arranged in an array. Each pixel typically comprises a reset circuit and a photodiode, which are used to produce a pixel signal level in accordance with the intensity of incident light. In operation, the reset circuit is used to charge the pixel to a highest level. Exposure of the photodiode to light causes the photodiode to produce a stray current, which reduces the charge of the pixel over time. Thus, the pixel signal level is integrated by exposing the pixel to light. The amount of integration is dependent upon the intensity of incident light upon the pixel and the sensitivity of the pixel.

Additionally, many CMOS image sensors generate pixel signal levels for each pixel by subtracting an integrated pixel signal level from a sampled reset level of the same pixel. In practice, the reset level is sampled shortly after the pixel has been reset. A storage element (such as a capacitor) is used to store the sampled reset level. Ideally, the sampled pixel level represents the level of the pixel when it has been reset to the highest level. The pixel is allowed to integrate for an exposure period. After the exposure period, the integrated pixel signal level is sampled (by a storage element such as a capacitor). The integrated pixel signal level is subtracted from the sampled reset level to produce the pixel signal level. For example, imaging a brighter object would cause a greater difference between the integrated pixel signal level and the sampled reset level, and imaging a dimmer object would cause a smaller difference between the integrated pixel signal level and the sampled reset level.

However, oversaturation may occur where incident light that is too strong causes the pixel to integrate appreciably from the time of reset until the time that the reset level is sampled. This reduction of the sampled reset signal adversely reduces the effective range of the pixel signal level because largest possible difference between the integrated pixel signal level and the sampled reset level is also reduced. Accordingly, brighter objects (which are represented by greater differences) will appear to be dimmer as a result of the reduced difference. In extreme cases (such as when imaging the sun directly), the pixel signal level will be at a black level despite the fact that a bright object is being imaged.

An oversaturation protection circuit in accordance with the present invention monitors an output column line that is associated with a pixel to determine whether the pixel is oversaturated after being reset. If the pixel is oversaturated after being reset, the level of the pixel is determined by measuring the difference between a first reference voltage and the integrated voltage of the pixel. The first reference voltage is selected to be the same as or greater than the unsaturated reset level of the pixel. If the pixel is not oversaturated after being reset, the level of the pixel is determined by measuring the difference between the voltage of the column line shortly after reset and the integrated voltage of the pixel.

The oversaturation protection circuit comprises a detector that is used to monitor the pixel. The detector may comprise a comparator. The comparison level used by the detector to detect the oversaturation level is selected to be the same as or slightly lower than the unsaturated reset level of the pixel.

FIG. 1 is a schematic diagram of an example CMOS image sensor having an oversaturation protection circuit used in accordance with the present invention. Oversaturation protection circuit 100 comprises a plurality of pixels 110. Pixels 110 are arranged in columns such that each column is associated with a sampler circuit (120). One or more sampler circuits 120 can be associated with detector 130. The output of detector 130 is coupled to logic gates X1–X7. The outputs of logic gates are coupled to the sampler circuits (120) that are associated with detector 130.

In operation, each individual pixel 110 provides an integrated voltage in response to the light that impinges each individual pixel 110. (The operation of pixel 110 is more fully described below with reference to FIG. 2.) Each individual pixel 110 drives the associated column line in response to a column select line. Detector 130 is arranged to monitor an associated column line to determine whether an associated pixel (110) is oversaturated.

Logic gates X1–X7 are arranged to provide a signal (or signals) for selecting a reference voltage to be used by sampler circuit 120. In various embodiments, alternative logic, such as Demorgan equivalents, can be used to achieve the same purpose for logic gates X1–X7.

The sampler circuit (120) that is associated with column line is arranged to sample the voltage levels on the column line. If the associated pixel (110) is oversaturated, the associated sampler circuit uses a first reference voltage for sampling the reset level of the pixel. If the associated pixel (110) is not oversaturated, the associated sampler stores the reset level that is generated within the associated pixel (110) as a second reference voltage.

Figure 2:
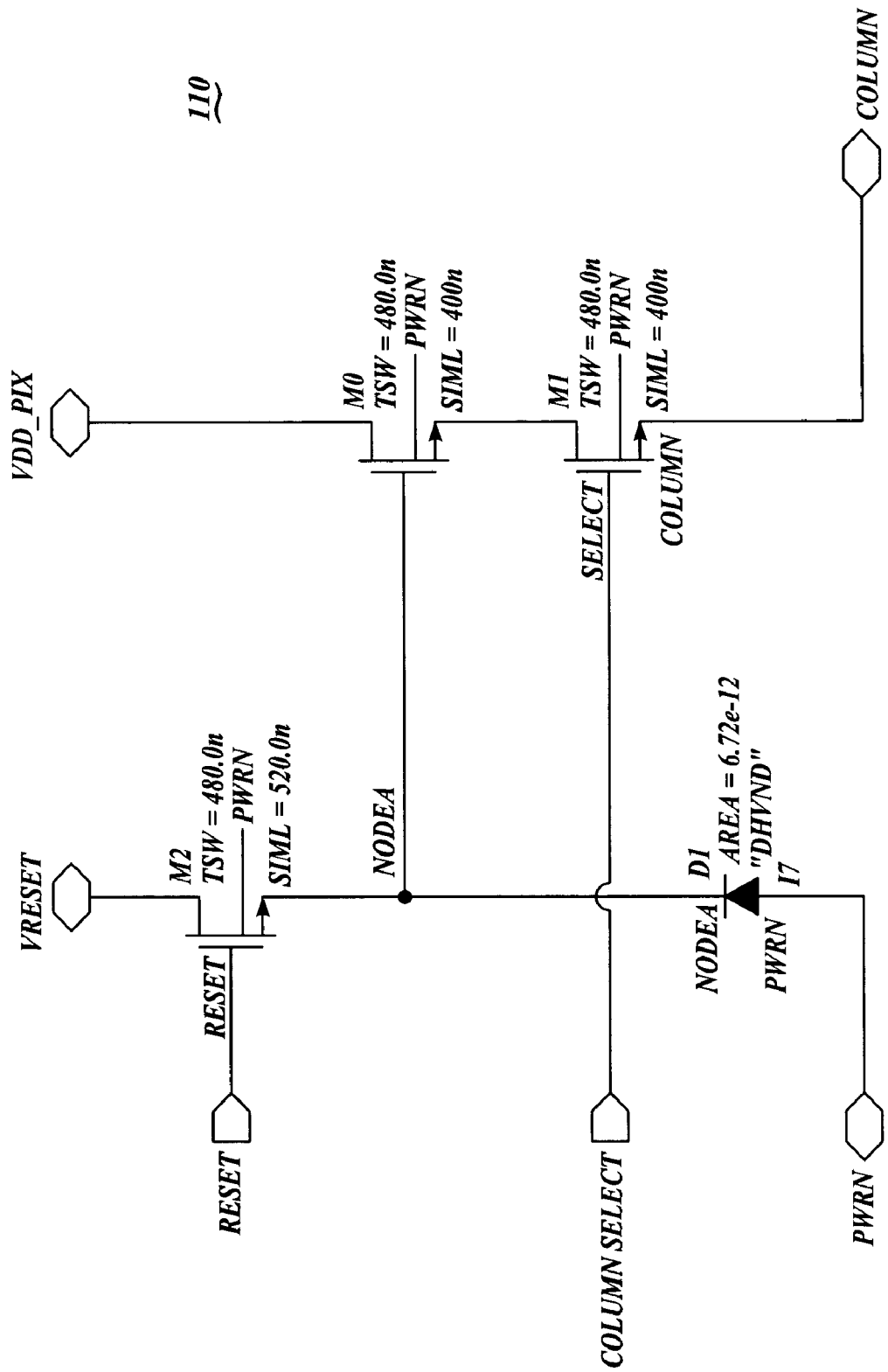
FIG. 2 is a schematic diagram of an example CMOS pixel used in accordance with the present invention.

FIG. 2 is a schematic diagram of an example CMOS pixel used in accordance with the present invention. The figure illustrates pixel 110, which is used to provide an output signal on associated column line in response to received light from an image. Pixel 110 comprises transistors M0–M2, and light-sensitive diode D1. In an example embodiment, transistors M1 and M2 are configured as switches (although other arrangements are possible).

In operation, pixel 110 is reset (i.e., initialized) to a predetermined voltage. Node reset is driven high, which turns on transistor M2 such that node A is driven to the voltage of node vreset. Subsequently node reset is driven low, which turns off transistor M2. At this time, pixel 110 is "integrated" by exposing diode D1 to light for a certain exposure time. The voltage at node A is decreased in response to light that impinges diode D1 during a certain exposure time. A certain exposure to light results in a reduced voltage at node A, while a lesser exposure to light results in a less reduced voltage at node A. Accordingly, the amount of decreased voltage of node A represents the desired (i.e., non-inverted) signal voltage. The desired signal voltage plus the resulting voltage of node A (i.e., the integrated voltage) equals the voltage of node vreset.

Transistor M0 buffers the integrated voltage and applies the buffered integrated voltage to transistor M1. Transistor M1 applies to be buffered integrated voltage to an associated column line in response to a column select signal being asserted.

Figure 3:
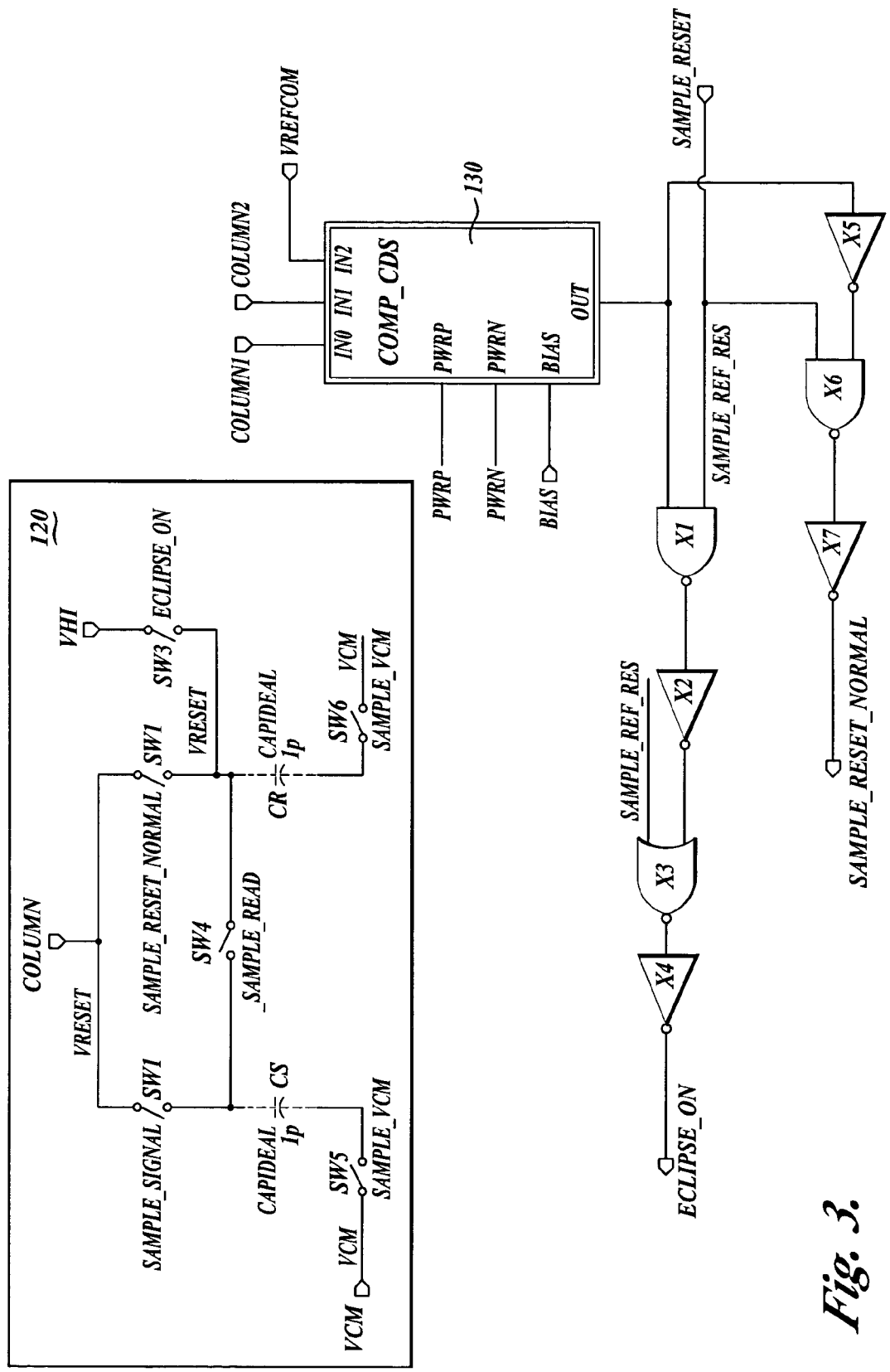
FIG. 3 is a schematic diagram of an example sampler circuit used in accordance with the present invention.

FIG. 3 is a schematic diagram of an example sampler circuit used in accordance with the present invention. Sampler circuit 120 is arranged to sample the voltage of an associated column line using a reference voltage that is selected in response to the output of comparator. In an embodiment, sampler circuit 120 is arranged as a correlated double sampler circuit. Sampler circuit 120 comprises switches SW1–SW6 and capacitors CS and CR.

In operation, sampler circuit 120 produces the desired (non-inverted) signal voltage by subtracting the integrated voltage (which is present on the column line) from the selected reference voltage. The integrated voltage is sampled on capacitor CS by closing switch SW1 at the end of the integration period. Switch SW1 is opened after capacitor CS receives a charge that is proportional to the integrated voltage.

The selected reference voltage is sampled by closing either switch SW2 or SW3 shortly after the end of the reset period. Either switch SW2 or SW3 is closed in response to the output of detector 130 (i.e., which indicates whether the pixel 110 is oversaturated). When switch SW2 is closed, the selected reference voltage is produced by pixel 110 at node A. When switch SW3 is closed, the selected reference voltage is driven to the voltage of node vhi. The voltage at node vhi is typically a voltage that is similar to the positive side of the power supply.

Switch SW3 is closed if the reference voltage that is produced at node A is subject to being integrated (due to the highly bright objects) even shortly after being reset. If pixel 110 is oversaturated, the reference voltage would be integrated (which would result in an erroneously low reference voltage). The erroneously low voltage causes the difference between the sampled integrated voltage and the erroneously low reference voltage to be reduced. Accordingly, the signal level is reduced, which renders the pixels of highly bright objects to be erroneously dim.

Detector 130 monitors the reference voltage produced on a column line to determine whether the reference voltage falls below the voltage on node vrefcom. In various embodiments, the voltage on node vrefcom may be programmable or fixed. In another embodiment, detector 130 may be configured to detect the presence of an excessive slew rate of the column line that would indicate integration of the column line.

The closed switch (i.e., either switch SW2 or SW3) is opened after capacitor CR has been charged to the selected reference voltage.

The desired signal voltage is determined by closing switches SW4–SW6 (after both capacitor CS has been charged to the integrated voltage and capacitor CR has been charged to the selected reference voltage). Closing switches SW4–SW6 produces a voltage at node vcm that is proportional to the desired signal voltage. The signal produced at node VCM may be conveyed using either single-ended or differential modes.

Various embodiments of the invention are possible without departing from the spirit and scope of the invention. For example, detector 130 may be configured to provide the status of the oversaturation to a plurality of samplers 120 of adjacent columns. Providing for the status to samplers 120 of adjacent columns allows the number of detectors 130 to be reduced, which reduces costs and power consumption. The column lines of "unmonitored" columns can be terminated using gates of dummy transistors within detector 130 so that the parasitics of the column lines are relatively matched.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A circuit for reducing oversaturation effects within CMOS image sensors, comprising:
    a first pixel that is configured to store during an initialization period a charge that is associated with a first reference voltage, to integrate during an exposure period the stored charge such that a voltage associated with the stored charge is decreased in response to received light, and to provide a first output signal that is associated with a remaining stored charge of the first pixel;

a detector that is configured to determine whether an oversaturation condition exists at a detection time that is after the initialization period and that is before the end of the integration period by monitoring a decrease in the first output signal that is associated with the remaining stored charge of the first pixel; and a first sampler that is configured to sample after the exposure period the first output signal to produce a first pixel sampled quantity that is associated with a first pixel within an image, sample in response to the detector determining that an oversaturation condition exists a second reference voltage after the detection time to produce a first reference sampled quantity, sample in response to the detector determining that an oversaturation condition does not exist the first output signal to produce the first reference sampled quantity, and to subtract the first pixel sampled quantity from the reference sampled quantity to produce a first pixel value for the image.

2. The circuit of claim 1, wherein the detector is further configured to compare the first output signal with a third reference voltage.

3. The circuit of claim 2, wherein the third reference voltage is fixed.

4. The circuit of claim 2, wherein the third reference voltage is programmable.

5. The circuit of claim 1, wherein the detector is further configured to monitor the voltage level of the first reference voltage.

6. The circuit of claim 1, wherein the first sampler is coupled to a first column line.

7. The circuit of claim 6, further comprising a second sampler that is configured to sample after the exposure period a second output signal produced by a second pixel that is associated with a second column line to produce a second pixel sampled quantity that is associated with a second pixel within an image, sample in response to the detector determining that an oversaturation condition exists a second reference voltage after the detection time to produce a second reference sampled quantity, sample in response to the detector determining that an oversaturation condition does not exist the second output signal to produce the second reference sampled quantity, and to subtract the second pixel sampled quantity from the second reference sampled quantity to produce a second pixel value for the image.

8. A method for reducing oversaturation effects within CMOS image sensors, comprising:

storing in a first pixel during an initialization period a charge that is associated with a first reference voltage;

integrating during an exposure period the stored charge such that a voltage associated with the stored charge is decreased in response to received light;

providing a first output signal that is associated with a remaining stored charge of the first pixel;

determining whether an oversaturation condition exists at a detection time that is after the initialization period and that is before the end of the integration period by monitoring a decrease in the first output signal that is associated with the remaining stored charge of the first pixel;

sampling after the exposure period the first output signal to produce a first pixel sampled quantity that is associated with a first pixel within an image;

sampling in response to the determination that an oversaturation condition exists a second reference voltage after the detection time to produce a first reference sampled quantity;

sampling in response to the detector determining that an oversaturation condition does not exist the first output signal to produce the first reference sampled quantity; and subtracting the first pixel sampled quantity from the reference sampled quantity to produce a first pixel value for the image.

9. The method of claim 8, wherein the oversaturation condition is determined by comparing the first output signal with a third reference voltage.

10. The method of claim 9, wherein the third reference voltage is fixed.

11. The method of claim 10, wherein the third reference voltage is programmable.

12. The method of claim 8, wherein the oversaturation condition is determined by monitoring the voltage level of the first reference voltage.

13. The method of claim 8, further comprising applying the first output signal to a first column line.

14. The method of claim 13, further comprising:

sampling after the exposure period a second output signal produced by a second pixel that applies the second output signal to a second column line to produce a second pixel sampled quantity that is associated with a second pixel within an image;

sampling in response to the determination that an oversaturation condition exists a second reference voltage after the detection time to produce a second reference sampled quantity;

sampling in response to the determination that an oversaturation condition does not exist the second output signal to produce the second reference sampled quantity; and subtracting the second pixel sampled quantity from the second reference sampled quantity to produce a second pixel value for the image.

15. A circuit for reducing oversaturation effects within CMOS image sensors, comprising:

means for storing in a first pixel during an initialization period a charge that is associated with a first reference voltage;

means for integrating during an exposure period the stored charge such that a voltage associated with the stored charge is decreased in response to received light;

means for providing a first output signal that is associated with a remaining stored charge of the first pixel;

means for determining whether an oversaturation condition exists at a detection time that is after the initialization period and that is before the end of the integration period by monitoring a decrease in the first output signal that is associated with the remaining stored charge of the first pixel;

means for sampling after the exposure period the first output signal to produce a first pixel sampled quantity that is associated with a first pixel within an image;

means for sampling in response to the determination that an oversaturation condition exists a second reference voltage after the detection time to produce a first reference sampled quantity;

means for sampling in response to the detector determining that an oversaturation condition does not exist the first output signal to produce the first reference sampled quantity; and means for subtracting the first pixel sampled quantity from the reference sampled quantity to produce a first pixel value for the image.

16. The circuit of claim 15, wherein the oversaturation condition is determined by comparing the first output signal with a third reference voltage.

17. The circuit of claim 16, wherein the third reference voltage is fixed.

18. The circuit of claim 16, wherein the third reference voltage is programmable.

19. The circuit of claim 15, further comprising means for applying the first output signal to a first column line.

20. The circuit of claim 19, further comprising:

means for sampling after the exposure period a second output signal produced by a second pixel that applies the second output signal to a second column line to produce a second pixel sampled quantity that is associated with a second pixel within an image;

means for sampling in response to the determination that an oversaturation condition exists a second reference voltage after the detection time to produce a second reference sampled quantity;

means for sampling in response to the determination that an oversaturation condition does not exist the second output signal to produce the second reference sampled quantity; and means for subtracting the second pixel sampled quantity from the second reference sampled quantity to produce a second pixel value for the image.

* * * * *

UNITED STATES PATENT AND TRADEMARK OFFICE
CERTIFICATE OF CORRECTION

| | | |
|---|---|---|
| PATENT NO. | : 7,167,200 B1 | Page 1 of 1 |
| APPLICATION NO. | : 10/607943 | |
| DATED | : January 23, 2007 | |
| INVENTOR(S) | : Bumha Lee et al. | |

It is certified that error appears in the above-identified patent and that said Letters Patent is hereby corrected as shown below:

Cover Page, Assignee, item 73    "National Semiconductor Corporation" should read --Eastman Kodak Company, Rochester, N.Y.--

Signed and Sealed this

Eighth Day of July, 2008

JON W. DUDAS
*Director of the United States Patent and Trademark Office*